Aug. 3, 1954 W. E. MOORE 2,685,435
COMBINATION FOOD MIXER AND LIQUEFIER
Filed Jan. 4, 1952 2 Sheets-Sheet 1
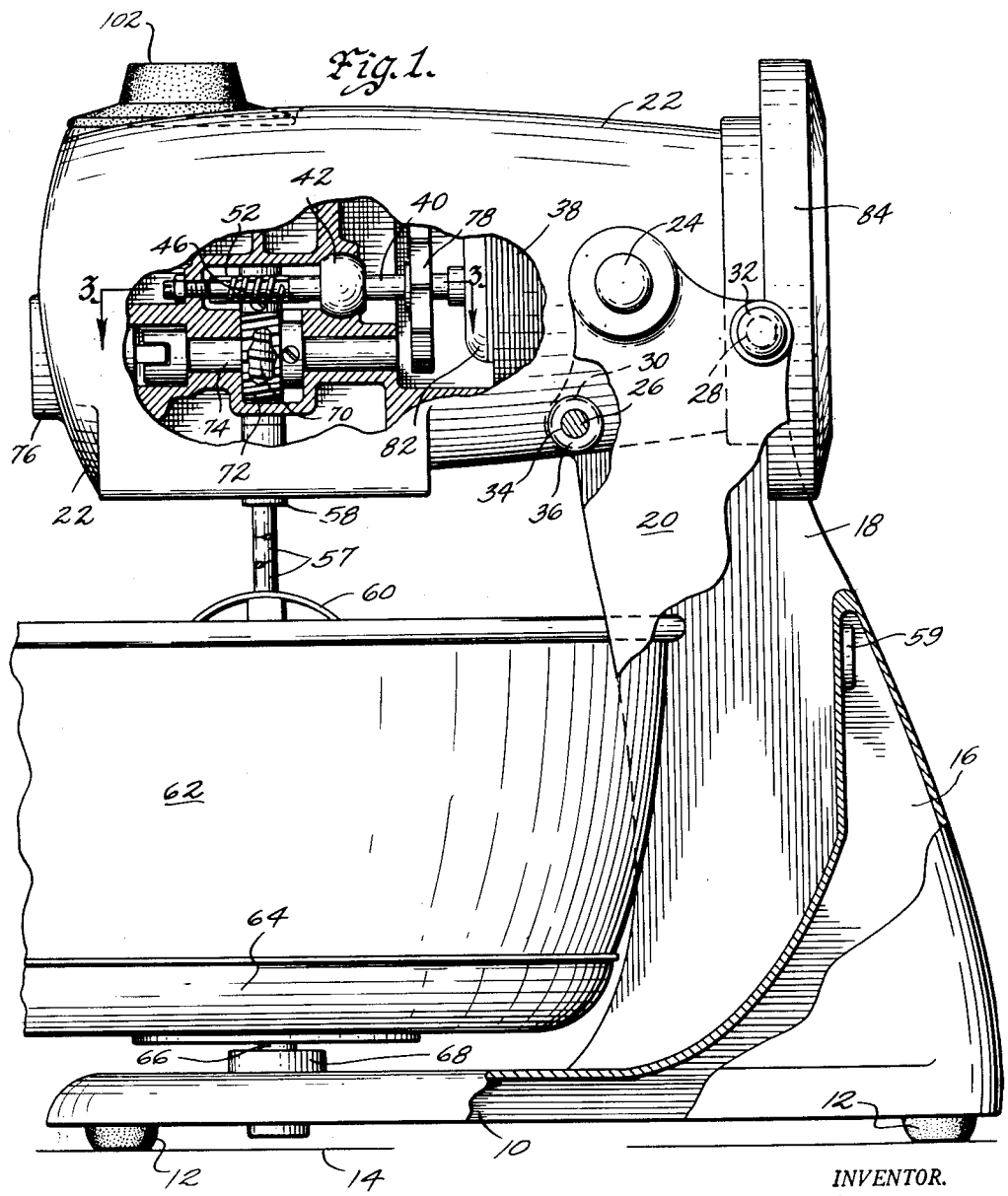
INVENTOR.
Walter E. Moore
BY Bair, Freeman
& Molinare Attys.

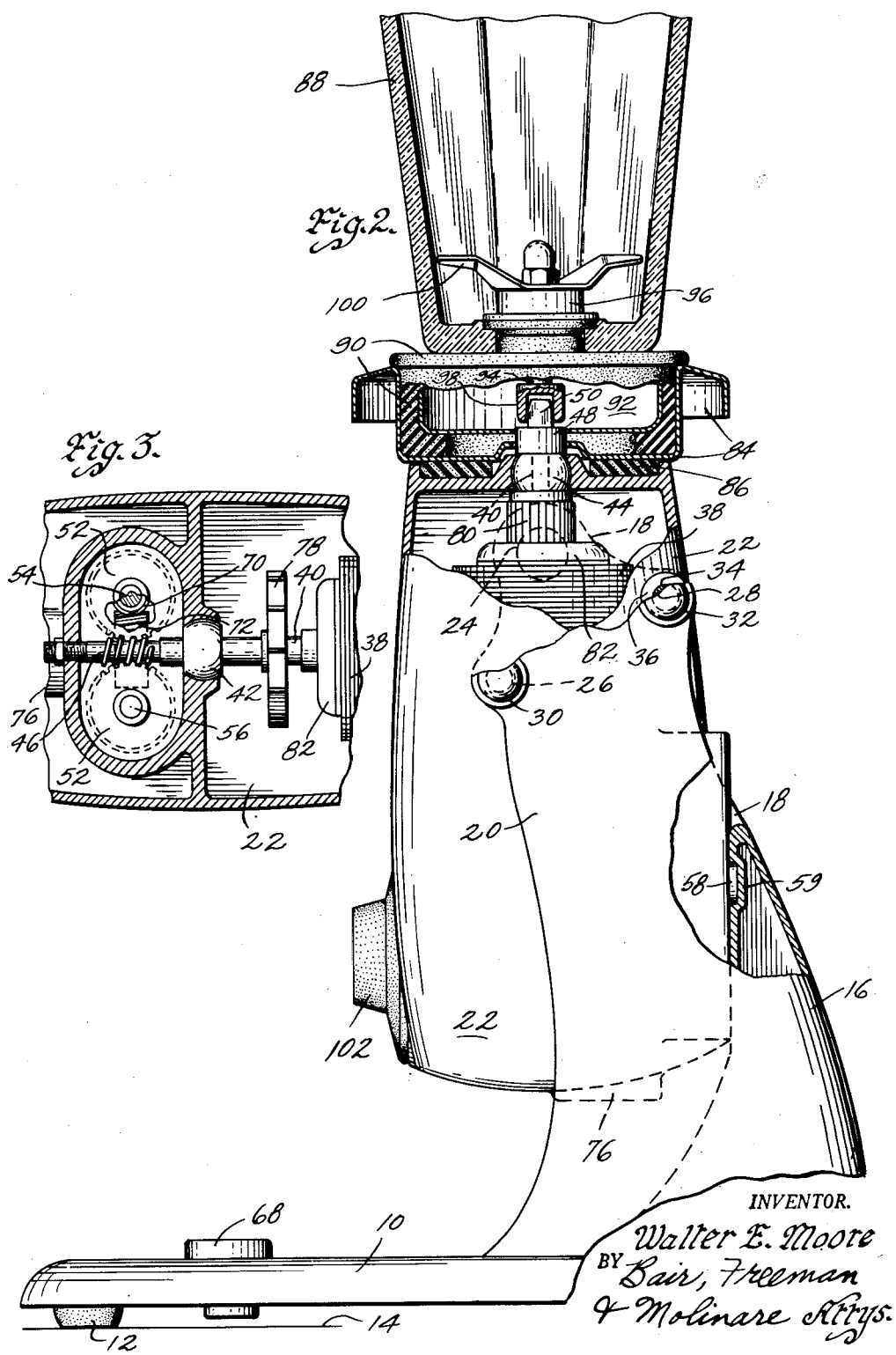

Patented Aug. 3, 1954

2,685,435

UNITED STATES PATENT OFFICE 2,685,435

COMBINATION FOOD MIXER AND LIQUEFIER

Walter E. Moore, Belnor, Mo., assignor to Knapp-Monarch Company, St. Louis, Mo., a corporation of Delaware Application January 4, 1952, Serial No. 265,004

4 Claims. (Cl. 259—1)

This invention relates to a unitary appliance adapted to perform two different desirable household operations, the appliance thereby taking the place of two appliances, thus saving room for storage and reducing the investment of the user in the single disclosed appliance compared with an investment in the two appliances.

One object of the invention is to provide an appliance so designed that a single motor supported thereby may serve either to operate food mixer elements at a reduced speed or a liquefier element at substantially the same speed as the motor, the arrangement being such that the motor may be pivoted to a horizontal position over a supporting base with mixer elements depending therefrom into a mixer bowl supported on the base, or a liquefier element may be directly connected with a shaft extending upwardly from one end of the motor when the motor is adjusted to a vertical position.

Another object is to provide the motor pivotally mounted to permit the motor to swing upwardly from horizontal position so that the food mixer elements may be withdrawn from the mixer bowl.

A further object is to provide means for locking the motor rigidly in either of two positions for proper operation as a food mixer or a liquefier.

With these and other objects in view, my invention consists in the construction, arrangement and combination of the various parts of my combination food mixer and liquefier, whereby the objects contemplated are attained, as hereinafter more fully set forth, pointed out in my claims and illustrated in the accompanying drawings; wherein:

Figure 1 is a side elevation with parts broken away and other parts shown in section, and illustrates a combined food mixer and liquefier embodying my invention, the motor of the appliance being adjusted to horizontal position for food mixing operations.

Figure 2 is a similar view with the motor adjusted to vertical position for liquefier operations; and Figure 3 is a sectional view on the line 3—3 of Figure 1 illustrating details of the drive between the motor and the mixer elements of the combination food mixer and liquefier.

On the accompanying drawings I have used the reference numeral 10 to indicate an appliance base which may be supported on feet 12 of rubber or the like to minimize the transmission of vibrations to a supporting surface such as a table top 14. The base 10 has integrally formed therewith an upright comprising portions 16, 18 and 20, the portions 18 and 20 being horizontally spaced arms to straddle a motor housing 22. The motor housing is pivoted to the upright arms 18 and 20 as at 24 so that the motor housing can be adjusted to the horizontal position of Figure 1 or to the vertical position of Figure 2 as desired.

Means is provided for locking the housing 22 in either of the positions mentioned comprising lock pins 26 and 28 carried by the upright arm 20 and provided with knobs 30 and 32 respectively for retracting the lock pins which are preferably spring extended to enter an opening 34 of a boss 36 on the motor housing 22. In Figure 1 the lock pin 26 is cooperating with the bore 34; whereas in Figure 2 the lock pin 28 is cooperating therewith. The motor housing 22 may thus be rigidly locked with respect to the base 10 and the upright 16—18—20 by the means just described.

Within the housing 22 I provide a motor 38 having a shaft 40 journaled in self-aligning bearing sleeves 42 and 44. The left end of this shaft, as shown in Figure 1, is provided with a worm 46; whereas the other end has connected therewith a coupling member 48 having a square, or at least other than round, projection 50.

The worm 46 is adapted to drive a pair of worm gears 52 (see Figure 3) in opposite directions for rotating beater shafts 54 and 56. A pair of detachable extension shafts 57 are connected with the shafts 54 and 56 and depend from bosses 58 of the motor housing 22 when it is in the horizontal position shown in Figure 1. The extension shafts 57 are provided with the usual food mixer elements 60 on their lower ends adapted to mix food in a mixer bowl 62. The mixer bowl is supported in a rotatable pan 64 having a shaft extension 66 located in a bearing 68 of the base 10 in the usual construction found in present day food mixers.

The beater shaft 54 may also be provided with a worm 70 meshing with a worm gear 72 on a food chopper drive shaft 74 so that a food chopper associated with a boss 76 of the motor housing 22 may also be driven by the motor 38 if desired. At 78 in Figures 1 and 2, I illustrate a cooling fan 78 for the motor and at 80 in Figure 2 a commutator therefor. The armature of the motor is indicated by the reference character 82.

With respect to the liquefier illustrated in Figure 2, this may be of the type shown in the Kochner et al. patent, No. 2,585,255. As here illustrated, it comprises a socket member 84 formed of sheet metal or the like and mounted on the upper end of the motor housing 22 when adjusted to the position of Figure 2 with a resilient washer 86 between the two to minimize vibrations of the motor 38 being transmitted to the liquefier. The liquefier itself then comprises a liquefier bowl 88 mounted on a resilient plug 90 adapted to be removably received in the socket 84, the plug being reinforced internally by a sheet metal member 92. A liquefier shaft 94 is rotatable in a mounting sleeve 96 of the liquefier bowl 88 and carries on its lower end a socket member 98 to receive the extension 50 of the coupling member 48. The upper end of the shaft 94 is connected to a liquefier blade 100 in order to rapidly rotate the blade when the motor 82 is energized. The blade 100 is effective to liquefy foods such as carrots, bananas, etc.

The beater extension shafts 57 are removable in the usual manner so that the beaters 60 need not be driven when the appliance is adjusted as in Figure 2 for liquefier operations. Likewise the bowl 88 and the liquefier blade 100 are detachable with respect to the appliance when it is being used for food mixing purposes as in Figure 1.

The foregoing specification discloses a combination appliance designed to operate efficiently either as a food mixer or a liquefier. The usual on-off switch and speed control shown generally at 102 may be provided for the motor 38 when operating in either capacity. A very simple arrangement is provided that permits either type of operation by removing the beaters 60 or the liquefier 88—100, depending on the operation desired, and the motor housing 22 may be quickly pivoted from one position to the other and rigidly locked in the desired position for operation. Also it may be unlocked and tipped upwardly from the Figure 1 position to facilitate removal of the bowl 62 without the necessity of first removing the beaters 60.

Some changes may be made in the construction and arrangement of the parts of my combination food mixer and liquefier without departing from the real spirit and purpose of my invention, and it is my intention to cover by my claims any modified forms of structure or use of mechanical equivalents which may be reasonably included within their scope.

I claim as my invention:

1. In a combination food mixer and liquefier, a support, a motor housing pivotally mounted on said support to assume either of two positions, a motor therein, one of said positions causing the axis of said motor to be horizontal and the other causing said axis to be vertical, said housing when in said horizontal position acting to substantially overhang said support as a cantilever, the major portion of said housing when in said vertical position being located substantially in vertical alignment with and below the pivotal mounting of said motor housing, means for locking said motor in either of said positions, rotary mixer elements extending downwardly from said housing at one end thereof and driven through speed reducing gearing by said motor when its axis is in said horizontal position, drive means extending from said motor to the other end of said housing, and a liquefier adapted to be mounted to extend upwardly from said housing and be directly driven by said motor at the other end of said housing when its axis is in said vertical position said pivotal mounting of said housing permitting the one end thereof from which said rotary mixer elements extend to be tilted downwardly so that the other end of said housing from which said liquefier extends is turned upwardly when the motor axis is in said vertical position.

2. A combination food mixer and liquefier comprising a base, an upright mounted thereon, a motor pivoted adjacent one of its ends to the upper end of said upright, the pivot axis being transverse to the motor axis to extend said motor horizontally from the pivot or depend it vertically therefrom, said motor axis intersecting said pivot axis, detachable mixer elements adapted to depend from said motor and to be driven at reduced speed thereby when said motor extends horizontally from the pivot, and a detachable liquefier comprising a bowl and a liquefier element therein adapted to extend upwardly from said motor with said liquefier element adapted to be driven directly from the shaft of said motor when it depends vertically from the pivot.

3. A combination food mixer and liquefier comprising a base, an upright mounted thereon, a motor pivoted adjacent one of its ends on an axis transverse to the motor axis to the upper end of said upright to extend horizontally from said pivot or depend vertically therefrom, said motor axis intersecting said pivot axis, detachable mixer elements adapted to depend from said motor and to be driven thereby when said motor extends horizontally from said pivot, a detachable liquefier adapted to extend upwardly from said motor and to be driven thereby when the motor depends vertically from said pivot, and means for connecting said motor with said upright in either of said positions at a point substantially spaced from the pivot axis to lock the motor against movement around said pivot.

4. A combination food mixer and liquefier comprising a base adapted to support a mixer bowl, an upright on said base, a motor pivoted adjacent one of its ends to the upper end of said upright and adjustable to either of two positions with the axis of the motor extending either horizontally or vertically, detachable mixer elements adapted to depend from the motor when its axis is horizontal into a bowl supported on said base and to be driven at reduced speed by said motor, a detachable liquefier bowl constituting an extension of the upper end of said motor when adjusted to position with its axis vertical, said bowl carrying a liquefier element adapted to be directly connected with the shaft of said motor when the motor extends vertically, said motor when in said vertical position being substantially in vertical alignment with the pivotal mounting thereof, and means for locking said motor in either of said positions.

References Cited in the file of this patent

UNITED STATES PATENTS

| Number | Name | Date |
| --- | --- | --- |
| 1,862,181 | Emmons | June 7, 1932 |
| 2,061,868 | Fitzgerald | Nov. 24, 1936 |
| 2,169,014 | Aaborg | Aug. 8, 1939 |
| 2,255,478 | Allenby | Sept. 9, 1941 |
| 2,584,887 | Lawrence | Feb. 5, 1952 |